United States Patent [19]
Gingell

[11] Patent Number: 5,477,529
[45] Date of Patent: Dec. 19, 1995

[54] ISDN SIGNAL TRANSMISSION PERFORMANCE MONITORING

[75] Inventor: Michael J. Gingell, Raleigh, N.C.

[73] Assignee: Alcatel Network Systems, Inc., Richardson, Tex.

[21] Appl. No.: 314,897

[22] Filed: Sep. 29, 1994

[51] Int. Cl.$^6$ .............................. H04J 3/14; G06F 11/00
[52] U.S. Cl. ........................... 370/13; 370/110.1; 370/99
[58] Field of Search .................................. 370/13, 110.1, 370/17, 99; 371/16.5, 49.1, 49.2

[56] References Cited

U.S. PATENT DOCUMENTS

| | | | |
|---|---|---|---|
| 4,688,207 | 8/1987 | Yoshimoto | 370/13 |
| 4,849,977 | 7/1989 | Baun, Jr. et al. | 371/49.1 |
| 5,060,229 | 10/1991 | Tyrrell et al. | 370/110.1 |
| 5,268,909 | 12/1993 | Loebig | 370/13 |
| 5,400,266 | 3/1995 | Sato et al. | 371/16.5 |

Primary Examiner—Douglas W. Olms
Assistant Examiner—Min Jung
Attorney, Agent, or Firm—Ware, Fressola, Van Der Sluys & Adolphson

[57] ABSTRACT

During ISDN signal transmission from a network trunk line (21) to an access line (18), a word (202) provided from the network trunk line is broken into two bytes including a data byte (205) and a performance monitoring byte (206). After signal transmission through common equipment (14) and an access line shelf (10), a line card (12) verifies the composite parity of the data byte and the performance monitoring byte to determine if an ISDN signal transmission error has occurred. During ISDN signal transmission from an access line (18) to a network trunk line (21), the line card (12) forms a data byte (305) by combining pairs of data bits from the access line, and simultaneously forms a performance monitoring byte (306) by combining pairs of performance monitoring bits corresponding to the pairs of data bits. After signal transmission of the data byte and performance monitoring byte through the access line shelf and common equipment, logic (65) is provided to determine if an ISDN signal transmission error has occurred. Thereafter, a word (302) is formed on the network trunk line, the word being made up of two bytes including the data byte and a second byte having a parity bit. The parity bit is set equal to the parity of the word if it is determined that a signal transmission error has not occurred and the parity bit is set opposite of the parity of the word if it is determined that a signal transmission error has occurred.

30 Claims, 3 Drawing Sheets

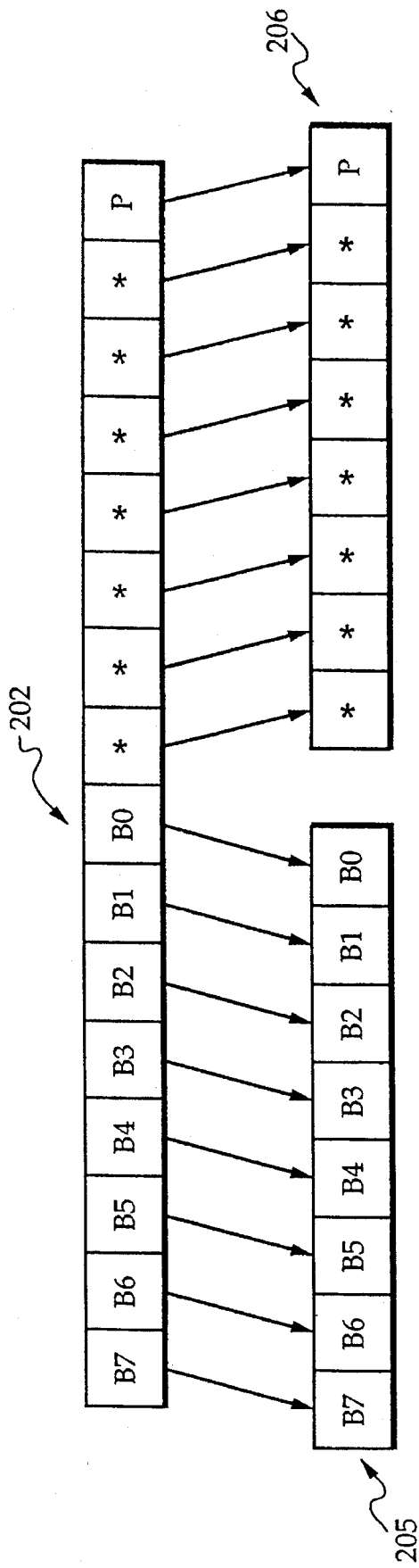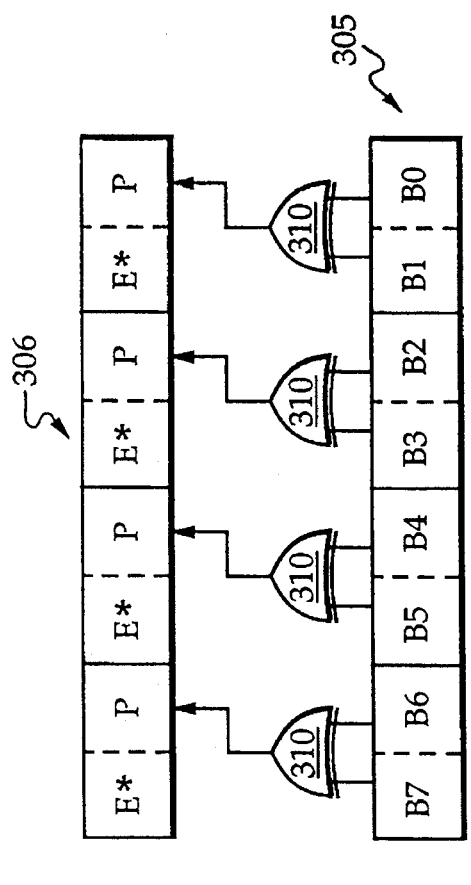
FIG. 2
FIG. 3

ISDN SIGNAL TRANSMISSION PERFORMANCE MONITORING

TECHNICAL FIELD

The present invention relates to communications and, more particularly, to integrated service digital network (ISDN) signal transmission performance monitoring.

BACKGROUND OF THE INVENTION

ISDN can be defined as a network that provides end-to-end digital connectivity to support a wide range of services, including voice and non-voice service, to which users have access by a limited set of standard multi-purpose user-network interfaces. A digital connection from the main network to an end user is called integrated digital access. ISDN access is defined in terms of channels including B channel and D channel. The B channel transmits data at 64 kb/s for carrying user information such as voice and coded information or data information which is either circuit or packet switched. The D channel is 16 kb/s, primarily for carrying signaling information for circuit switching. The D channel may also carry packet switched information.

Typically, two types of access are provided. The first is basic rate access, which contains two (2) B channels and one (1) 16 kb/s D channel (2B+D) for a total of 144 kb/s. Each B channel can have a different directory number if required and both channels may carry voice or data up to 64 kb/s. The second type of access is primary rate access and typically includes thirty (30) B channels and one (1) 64 kb/s D channel (30B+D), which is typically used in a 2.048 Mb/s CEPT network. This access is mainly provided for connecting digital private branch exchanges (PBX) to the ISDN.

Access lines, e.g., telephone lines, provide a signal path between end users and a central office for carrying ISDN signals. At the central office, the access lines terminate at line cards, e.g., circuit boards, which provide physical terminations to the access lines, in addition to other features. The central office provides switching equipment, and other common equipment, used to connect the access lines to outgoing trunk lines of a communications network. The trunk lines are higher order transports than the access lines, such as a serial bus interface (SBI) provided as described in U.S. Pat. No. 5,060,229.

As described above, the access lines terminate in line cards which are carried in access line shelves. Each access line shelf comprises a plurality of line cards which are connected to the network trunk lines through a back plane of the access line shelf, and the common equipment and logic. During signal transmission between an access line and a trunk line, performance monitoring exists only between the common equipment in the central office and the network trunk lines. If a failure occurs in the signal transmission between the common equipment, the line card, and the access line, this failure may go undetected. This type of failure, referred to as a silent failure, is unacceptable, and therefore, a mechanism for determining that ISDN signal transmission failures are occurring is required.

DISCLOSURE OF INVENTION

Objects of the invention include the provision of performance monitoring during signal transmission between an access line, through an access line shelf, common equipment and common logic, to a network trunk line.

Another object of the present invention is to provide a simple and reliable method of detecting ISDN signal transmission errors during ISDN signal transmission between an access line via a central office to a network trunk line.

According to the present invention, during ISDN signal transmission between an access line and a network trunk line, a word on the network trunk line is associated with two bytes on a line card which terminates the access line, one byte containing data to be transmitted and the other byte containing performance monitoring data for determination of whether or not an ISDN signal transmission error has occurred.

According further to the present invention, during signal transmission from the network trunk line to the access line, a word provided from the network trunk line is broken into two bytes including a data byte and a performance monitoring byte; after signal transmission through common equipment and an access line shelf, a line card verifies the composite parity of the data byte and the performance monitoring byte to determine if an ISDN signal transmission error has occurred.

According still further to the present invention, a performance monitoring counter is incremented in response to an ISDN signal transmission error during signal transmission from the network trunk line to the access line.

In further accord with the present invention, during ISDN signal transmission from an access line to a trunk line, the line card forms a data byte by combining pairs of data bits from the access line, and simultaneously forms a performance monitoring byte by combining pairs of performance monitoring bits corresponding to the pairs of data bits, the first bit in each pair of performance monitoring bits providing an ISDN flag and the second bit in each pair of performance monitoring bits is a parity bit computed based on the corresponding pair of data bits; after signal transmission of the data byte and performance monitoring byte through the access line shelf and common equipment, logic is provided to examine if the parity of the pairs of data bits in the transmitted data byte match the parity indicated by the corresponding pairs of performance monitoring bits in the transmitted performance monitoring byte to determine if an ISDN signal transmission error has occurred.

In still further accord with the present invention, after determination if an ISDN signal transmission error has occurred during signal transmission from an access line to a network trunk line, the bits forming the performance monitoring byte are cleared, and a parity bit is set to indicate whether or not an ISDN signal transmission error has occurred, and the data byte is combined with the resultant performance monitoring byte to provide a word to the network trunk line.

The present invention provides a significant improvement over the prior art by providing performance monitoring during ISDN signal transmission between an access line and a network trunk line. Therefore, signal transmission errors, which heretofore had gone undetected, may now be easily detected in a simple and reliable manner so that corrective action may be taken as necessary. Additionally, the present invention may be implemented using existing signal lines and simple hardware and/or software modifications.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 2 is a timing diagram showing time slot data of a word transmitted from a network trunk line which is used to form a data byte and a performance monitoring byte on an access line;

FIG. 3 is a combination timing diagram and logic diagram showing a data byte formed by pairs of data bits and a performance monitoring byte formed by pairs of performance monitoring bits.

BEST MODE FOR CARRYING OUT THE INVENTION

The ISDN signal transmission performance monitoring system of the present invention is particularly well suited for detecting ISDN signal transmission errors during signal transmission between an access line and a network trunk line. As described hereinabove, an access line typically refers to a line which is used to connect a user, e.g., a telephone, digital computer, facsimile, modem, etc., with a central office. A central office is a facility where access lines are terminated at line cards, and contains the switching equipment and logic which is used to connect the various access lines to outgoing network trunk lines. The network trunk lines are typically higher order transports than the access lines. An access line shelf is used to carry a plurality of access line cards, the access line shelf having a back plane for holding the line cards. A plurality of access line shelves are located at the central office.

For ease of explanation and understanding, the present invention will be described with respect to a single line card for interfacing an access line and a trunk line via the associated access line shelf, common equipment and other logic. However, it will be understood by those skilled in the art that the present invention is applicable to each of the line cards carried in an access line shelf to thereby provide the performance monitoring in accordance with the present invention.

Figure 1:
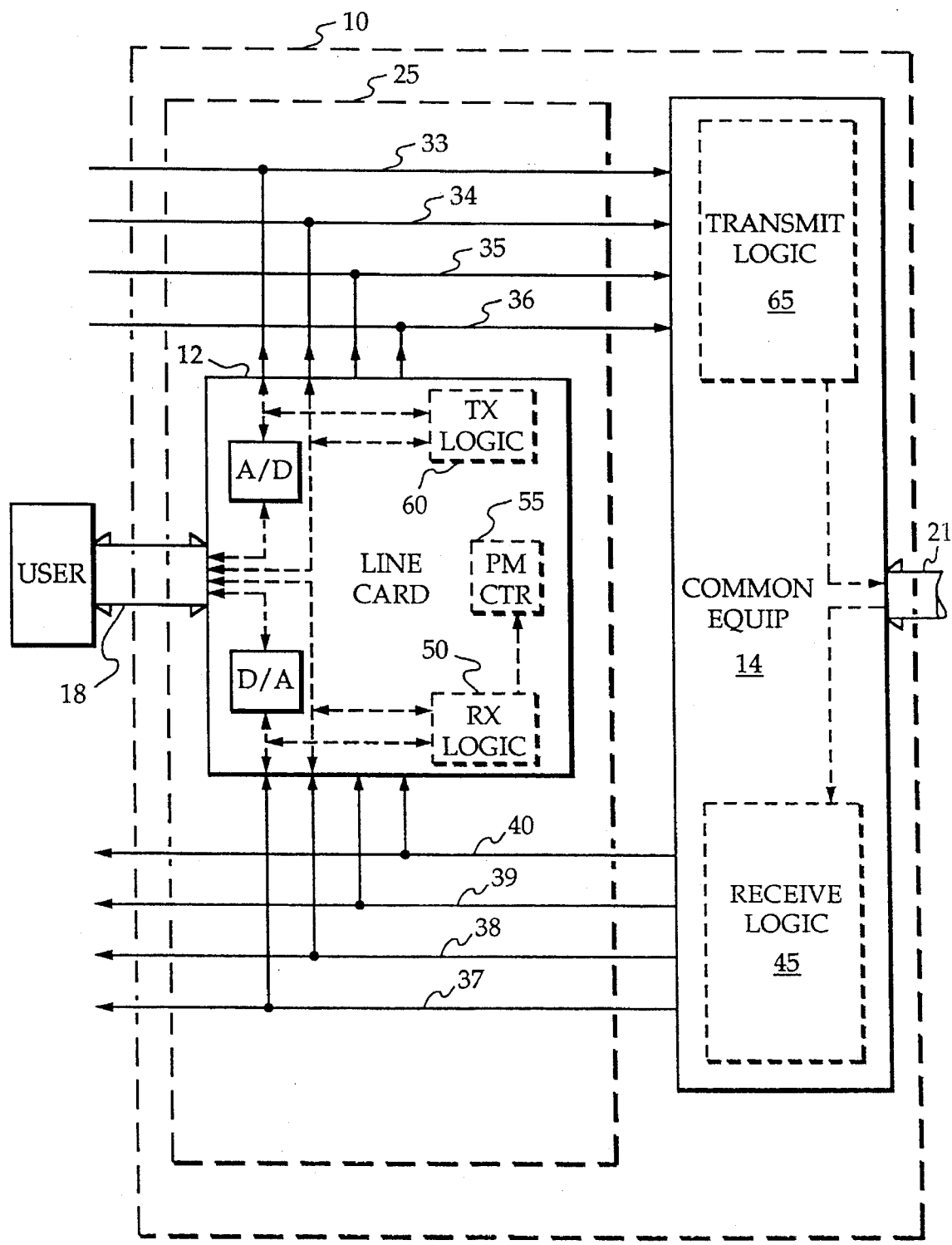
FIG. 1 is a simplified schematic block diagram of a signal transmission network utilizing the ISDN signal transmission performance monitoring of the present invention.

The present invention is intended for use with a signal transmission system of the type shown in FIG. 1, although modifications thereof are certainly within the contemplated stage of the present invention. Referring to FIG. 1, an access line shelf 10, e.g., an LCX50 (1501AN) line shelf manufactured by Alcatel Network Systems, comprises a plurality of line cards 12 and associated common equipment 14 which includes various switching equipment and associated logic for establishing a connection between an access line 18 and a network trunk line 21. The line card is a circuit board which provides a physical termination to the access line 18 in addition to providing other features. Each of the line cards 12 are mounted in a back plane 25 of the access line shelf 10. As is known in the art, the back plane is a printed circuit board having one or more bus connectors for providing signal communication between various bus modules, in this case line cards, and a signal transmission bus to thereby provide signal communication between the line cards and various resources on the bus.

The line card 12 may, for example, be connected via the back plane 25 and eight buses 33–40 to the common equipment 14. Four buses may be provided in each direction. Buses 33–36 are provided in the receive direction and buses 37–40 are provided in the transmit direction. Buses 33 and 37 are PCM, i.e., data buses, buses 34 and 38 are signaling buses, buses 35 and 39 are provisioning buses and bus 40 carries configuration control information for determining which line card is to be activated at which time slot. Bus 36 is typically not used in the prior art systems; however, in accordance with the present invention, this bus is used for performance monitoring, as will be described in greater detail hereinafter. It should be understood that other line card interfaces are possible for use in implementing the present invention. The interface described herein shows merely one way to carry out the present invention.

The eight buses may provide signal transmission of serial data at 2.048 Mb/s, the data being made up of sub-frames comprising thirty-two (32) time slots of eight (8) bits each in an eight (8) kHz master frame. As is known in the art, such data can be merged onto the buses by having each line card three-state, e.g., low, high and off or high impedance, its data onto the appropriate bus at the appropriate time. Normally, for the embodiment shown, data is enabled for eight bits since a PCM or signaling byte is eight bits long.

With packed D channel ISDN signals provided on the access line 18, it is necessary to enable transmission onto the PCM bus for just two clocks. This allows the sixteen (16) kb/s D channel data to be combined from up to four different cards into a single eight (8) bit PCM byte. On the network side of the common equipment 14, the network trunk line 21 is a serial bus interface (SBI) as described in the above-mentioned U.S. Pat. No. 5,060,229 which carries serial data at 4.096 Mb/s which is made up of sub-frames comprising thirty-two (32) time slots of sixteen (16) bits each in an eight (8) kHz master frame. The sixteen (16) bit words include PCM data, signaling, and a parity bit so that errors may be detected during the SBI transport.

All of the apparatus described thus far, with the exception of the performance monitoring bus 36, is simply exemplary of that which is well known in the art. Performance monitoring of the SBI transport data on the line 21 is provided by the parity bit in the sixteen (16) bit word, however, the problem remains of how to provide performance monitoring of the ISDN data provided on the access line 18 via the line card 12, back plane 25, and common equipment 14.

In accordance with the present invention, a "transparent mode" in the line card and common equipment is provided whenever a channel is being used for ISDN signal transmission. The transparent mode provides the desired performance monitoring in both the transmit and receive directions, however, it is implemented differently in the transmit and receive directions. Referring to FIGS. 1 and 2, in the receive direction, wherein signal transmission is being provided from the network trunk line 21 to the access line 18, a sixteen (16) bit word 202 is broken down into two eight (8) bit bytes including a data byte 205 and a performance monitoring byte 206. Receive logic 45 is provided in the common equipment 14 to break the sixteen (16) bit word 202 into the data byte 205 and the performance monitoring byte 206. The receive logic 45 provides the data byte to a PCM time slot on the PCM receive bus 37, and the receive logic 45 provides the remaining eight (8) bit performance monitoring byte to the receive signaling bus 38. The performance monitoring byte contains no useful data for ISDN, but taken with the data byte, the parity bit in the performance monitoring byte determines whether or not there has been a transmission error.

The line card 12 is also provided with receive logic 50 which combines corresponding data bytes on the PCM bus 37 and performance monitoring bytes on the signaling bus 38 to thereby provide a composite signal. Thereafter, the receive logic 50 in the line card 12 checks the parity of the composite signal to determine if a transmission error has occurred during signal transmission through the common equipment 14 and back plane 25 to the line card 12. If a transmission error is detected, the receive logic 50 in the line card 12 increments a performance monitoring counter 55. The performance monitoring counter 55 provides information to the central office indicative of the incidence of signal transmission errors. The performance monitoring counter 55 may signal the central office when its count exceeds a predetermined threshold level. Alternatively, it may signal the central office when a predetermined number of signal transmission errors occur in a threshold period of time.

During signal transmission in the transmit direction, wherein signal transmission is provided from the access line 18 to the network trunk line 21, a more complex design is required to implement the transparent mode. As is known in the art, an ISDN card may inject either eight (8) or two (2) bits into a given PCM time slot depending on whether it is a B or D channel. The present invention will be described with respect to an ISDN card which injects two (2) bits into a PCM time slot from a D channel but of course is not restructed thereto. As described hereinabove, the spare transmit bus 36 is used for transmit performance monitoring. Referring to FIGS. 1 and 3, transmit logic 60 is provided in the line card 12 to form a data byte 305 from four two bit pairs (subslots), the data byte 305 being injected onto the PCM bus 33. Simultaneously with the injection of each two bit pair into the data byte 305, two bit pairs are injected onto the ISDN performance monitoring bus 36 to form a performance monitoring byte 306. One bit in each pair of bits injected onto the performance monitoring bus is an active low flag (ENABLE bit), E*, indicating that this two bit pair is in use by the ISDN card, and the second bit is a parity bit computed based on the parity of the two bits inserted into the data byte 305 on the PCM bus. For example, referring to FIG. 3, if bits B7 and B6 represent a two bit subslot injected into the first two time slots of the data byte 305, then the first bit of the performance monitoring byte 306, E*, will be an active low flag, and the second bit will be a parity bit computed based on the parity of bits B7 and B6. As is well known in the art, EXCLUSIVE-OR gates 310 may be used to compute the parity of the two bit subslots.

Figure 4:
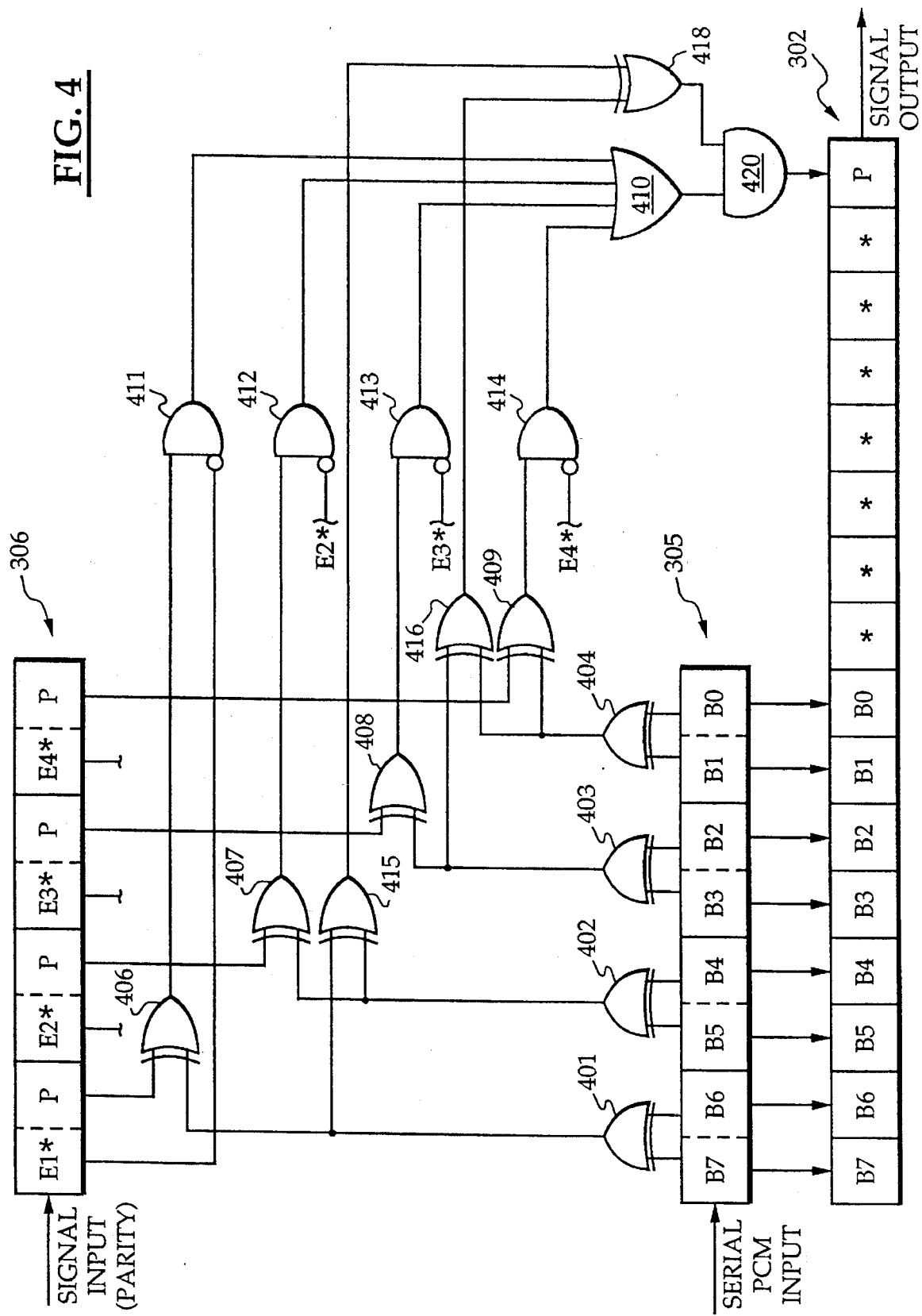
FIG. 4 is a combination timing diagram and logic diagram showing the resultant word formed by the combination of the data byte and the performance monitoring byte after signal transmission from an access line to a network trunk line.

Referring to FIGS. 1 and 4, after transmission of the data byte 305 and performance monitoring byte 306 from the line card, through the back plane 25 and to the common equipment 14, transmit logic 65 is provided in the common equipment 14 to examine the four subslots of the data byte 305 and compare the parity of the four subslots with the four parity bits received from the performance monitoring byte. Additionally, the transmit logic 65 uses the data byte 305 to fill the first eight bits of the SBI word 302, and a parity bit is provided as the last bit of the SBI word 302 based on the parity of the first eight bits. If the transmit logic 65 detects that the parity of any one of the two bit components of the data byte was bad, then the parity of the composite SBI word is forced bad so that the receiving end will know that signal transmission errors are occurring.

Referring now to FIG. 4, the transmit logic 65 will be described in greater detail. The performance monitoring of the transmit logic 65 is based on the well known principal that the combined parity of a parity bit and the data bits used to determine the parity bit will always be odd, e.g. logic zero. Therefore, if the transmit logic 65 detects that the composite parity of a parity bit of the performance monitoring byte 306 and corresponding two bit subslot of the data bit 305 is even, e.g., logic one, then a data transmission error has occurred. EXCLUSIVE-OR gates 401, 402, 403, and 404 are provided for each of the two bit subslots of the data byte 305. The output of each of the EXCLUSIVE-OR gates 401–404 is provided to one input of a second EXCLUSIVE-OR gate 406–409, the other input of which is the corresponding parity bit in the performance monitoring byte 306.

The output of each of the second EXCLUSIVE-OR gates 406–409 is provided as an input to an OR gate 410 via a corresponding AND gate 411–414. The other input to the AND gates 411–414 is the ENABLE bit, E*, corresponding to the parity bit provided to the second EXCLUSIVE-OR gates 406–409. Each ENABLE bit is provided to the corresponding AND gate 411–414 via an inverting terminal. Therefore, the ENABLE bit allows the system to be partially equipped with ISDN, and only those channels with an active low flag, e.g., E*=0, are checked by the ISDN parity logic. Using the logic configuration described herein above, if any one of the second EXCLUSIVE-OR gates indicates even parity, e.g. logic one, or if any one of the ENABLE bits is active flag low, e.g., E*=0, then the output of the OR gate 410 will be a logic one.

EXCLUSIVE-OR gates 415, 416 and 418 are provided in conjunction with EXCLUSIVE-OR gates 401–404 to provide an EXCLUSIVE-OR gate tree for determining the parity of the combined subslots of the data byte 305. The outputs of the EXCLUSIVE-OR gates 401 and 402 are provided to the inputs of the EXCLUSIVE-OR gate 415 and the outputs of the EXCLUSIVE-OR gates 403 and 404 are provided to the inputs of the EXCLUSIVE-OR gate 416. Thereafter, the outputs of the EXCLUSIVE-OR gates 415 and 416 are provided to the inputs of the EXCLUSIVE-OR gate 418 the output of which is the parity of the data byte 305.

The parity bit of the SBI word 302 is provided by the output of an AND gate 420, the inputs of which are the output of the OR gate 410 and the output of the EXCLUSIVE-OR gate 418. Therefore, if no signal transmission error is detected during the transmission of the data byte 305 and performance monitoring byte 306, the output of the OR gate 410 will be a logic low and the output of the AND gate 420 will be equal to the output of the EXCLUSIVE-OR gate 418, which is the parity of the data byte 305. However, if a signal transmission error is detected during transmission of the data byte 305 and performance monitoring byte 306, then the output of one or more of the second EXCLUSIVE-OR gates 406–409 will be a logic one, and therefore the output of the OR gate 410 will be a logic one. This will cause the parity of the composite outgoing SBI word to be forced bad so that the receiving end will know that transmission errors are occurring.

Although the invention is described and illustrated with respect to a single line card 12 carried in the back plane 25 of an access line shelf 10, it will be understood by those skilled in the art that the invention is applicable to a plurality of line cards carried in the back plane of the access line shelf.

Although the transmit and receive logic of the invention is described herein as comprising logic gates for implementing the performance monitoring of the invention, it will be understood by those skilled in the art that the invention may be implemented with a computer program change to a digital processor or computer in the line card and common equipment. Of course, the invention could be implemented with dedicated digital or analog hardware, if desired.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

I claim:

1. A performance monitoring system for determining if a signal transmission error has occurred during signal transmission between an access line and a network trunk line, the access line terminating at a line card which is mounted in an access line shelf, the access line shelf also including common equipment wherein the network trunkline terminates, wherein words on the network trunk line each correspond to a data byte and a performance monitoring byte on the line card, said data byte containing data to be transmitted between the access line and the network trunk line and said performance monitoring byte containing performance monitoring data for determination of whether or not a signal transmission error has occurred, said performance monitoring system comprising:

receive logic means for determining if a signal transmission error has occurred during signal transmission from the network trunk line to the access line; and transmit logic means for determining if a signal transmission error has occurred during signal transmission from the access line to the network trunk line.

2. A performance monitoring system according to claim 1 wherein the common equipment is used to direct the transmission of signals between a plurality of access lines and a plurality of network trunk lines.

3. A performance monitoring system according to claim 2 wherein said receive logic means includes first receive logic in the common equipment for receiving said words from the network trunk line and for breaking each one of said words into two corresponding bytes including said data byte and said performance monitoring byte for signal transmission from the network trunk line to the line card.

4. A performance monitoring system according to claim 3 wherein said receive logic means further includes second receive logic in the line card for combining said corresponding data byte and performance monitoring byte transmitted from said first receive logic, for determining a composite parity of said combined data byte and performance monitoring byte, and for checking the composite parity of said combined data byte and performance monitoring byte to determine if a signal transmission error has occurred.

5. A performance monitoring system according to claim 4 wherein said receive logic means further includes a performance monitoring counter, said performance monitoring counter being incremented in response to said second receive logic determining that a signal transmission error has occurred.

6. A performance monitoring system according to claim 2 wherein said transmit logic means includes first transmit logic in the line card for combining pairs of data bits received from the access line into said data byte, and for combining pairs of performance monitoring bits into said performance monitoring byte, each pair of said performance monitoring bits corresponding to a pair of said data bits, one bit in each pair of performance monitoring bits being a flag indicative of performance monitoring and the other bit in each pair of performance monitoring bits being a parity bit which is computed based on the parity of the corresponding pair of data bits.

7. A performance monitoring system according to claim 6 wherein said transmit logic means further includes second transmit logic in the common equipment for determining that a signal transmission error has not occurred if the parity indicated by each pair of data bits in a data byte transmitted from said first transmit logic matches the parity indicated by the corresponding pairs of performance monitoring bits in a corresponding performance monitoring byte transmitted from said first transmit logic, and for determining that a signal transmission error has occurred if the parity indicated by any one of the pairs of data bits in a data byte transmitted from said first transmit logic does not match the parity indicated by a corresponding pair of performance monitoring bits in a corresponding performance monitoring byte transmitted from said first transmit logic.

8. A performance monitoring system according to claim 7 wherein said second transmit logic further comprises means for forming a word on the network trunk line, said word being made up of two bytes including said data byte transmitted from said first transmit logic and said performance monitoring byte, the value of said performance monitoring byte being set equal to a parity bit, said parity bit being set to the parity of said word if said second transmit logic determines that a signal transmission error has not occurred, said parity bit being set to the opposite of the parity of said word if said second transmit logic determines that a signal transmission error has occurred.

9. A performance monitoring system according to claim 8 wherein said receive logic means includes first receive logic in the common equipment for receiving said words from the network trunk line and for breaking each one of said words into two corresponding bytes including said data byte and said performance monitoring byte for signal transmission from the network trunk line to the line card.

10. A performance monitoring system according to claim 9 wherein said receive logic means further includes second receive logic in the line card for combining said corresponding data byte and performance monitoring byte transmitted from said first receive logic, for determining a composite parity of said combined data byte and performance monitoring byte, and for checking the composite parity of said combined data byte and performance monitoring byte to determine if a signal transmission error has occurred.

11. A performance monitoring system according to claim 10 wherein said receive logic means further includes a performance monitoring counter, said performance monitoring counter being incremented in response to said second receive logic determining that a signal transmission error has occurred.

12. A performance monitoring system according to claim 4 wherein said transmit logic means includes first transmit logic in the line card for combining pairs of data bits received from the access line into said data byte, and for combining pairs of performance monitoring bits into said performance monitoring byte, each pair of said performance monitoring bits corresponding to a pair of said data bits, one bit in each pair of performance monitoring bits being a flag indicative of performance monitoring and the other bit in each pair of performance monitoring bits being a parity bit which is computed based on the parity of the corresponding pair of data bits.

13. A performance monitoring system according to claim 12 wherein said transmit logic means further includes second transmit logic in the common equipment for determining that a signal transmission error has not occurred if the parity indicated by each pair of data bits in a data byte transmitted from said first transmit logic matches the parity indicated by the corresponding pairs of performance monitoring bits in a corresponding performance monitoring byte transmitted from said first transmit logic, and for determining that a signal transmission error has occurred if the parity indicated by any one of the pairs of data bits in a data byte transmitted from said first transmit logic does not match the parity indicated by a corresponding pair of performance monitoring bits in a corresponding performance monitoring byte transmitted from said first transmit logic.

14. A performance monitoring system according to claim 13 wherein said second transmit logic further comprises means for forming a word on the network trunk line, said word being made up of two bytes including said data byte transmitted from said first transmit logic and said performance monitoring byte, the value of said performance monitoring byte being set equal to a parity bit, said parity bit being set to the parity of said word if said second transmit logic determines that a signal transmission error has not occurred, said parity bit being set to the opposite of the parity of said word if said second transmit logic determines that a signal transmission error has occurred.

15. A performance monitoring system according to claim 14 wherein said line card further comprises a performance monitoring counter, said performance monitoring counter being incremented in response to said second receive logic determining that a signal transmission error has occurred.

16. A method for determining if a signal transmission error has occurred during signal transmission between an access line and a network trunk line, the access line terminating at a line card mounted in an access line shelf, the access line shelf also including common equipment wherein the network trunkline terminates, wherein words on the network trunk line each correspond to a data byte and a performance monitoring byte on the line card, said data byte containing data to be transmitted between the access line and the network trunk line and said performance monitoring byte containing performance monitoring data for determination of whether or not a signal transmission error has occurred; the method comprising the steps of:

performing signal transmission from the network trunk line to the access line, including: receiving said words from the network trunk line, breaking each one of said words into two corresponding bytes including said data byte and said performance monitoring byte, transmitting said corresponding bytes to the line card, and performing performance monitoring to determine if a signal transmission error has occurred; and performing signal transmission from the access line to the network trunk line, including: receiving pairs of data bits from the access line, combining said pairs of data bits into data bytes, generating pairs of performance monitoring bits combining said pairs of performance monitoring bits into performance monitoring bytes, transmitting corresponding pairs of data bytes and performance monitoring bytes to the common equipment, and performing performance monitoring to determine if a signal transmitting error has occurred.

17. The method of claim 16 wherein said step of performing signal transmission from the network trunk line to the access line includes:

after said step of transmitting said corresponding bytes to the line card, combining said corresponding bytes; and after combining said corresponding bytes, determining a composite parity of said corresponding bytes; and checking the composite parity of said corresponding bytes to determine if a signal transmission error has occurred.

18. The method of claim 17 further comprising the step of incrementing a performance monitoring counter if a signal transmission error has occurred.

19. The method of claim 16 wherein said step of performing signal transmission from the network trunk line to the access line includes:

after said step of transmitting said corresponding bytes to the line card, determining a composite parity of said corresponding bytes and;

checking the composite parity of said corresponding bytes to determine if a signal transmission error has occurred.

20. The method of claim 19 further comprising the step of incrementing a performance monitoring counter if a signal transmission error has occurred.

21. The method according to claim 16 wherein the common equipment is used to direct the transmission of signals between a plurality of access lines and a plurality of network trunk lines.

22. The method of claim 21 wherein for signal transmission from the access line to the network trunk line, one bit in each pair of performance monitoring bits is set equal to a performance monitoring flag indicative of performance monitoring and the other bit in each pair of performance monitoring bits is computed based on the parity of a corresponding pair of said data bits.

23. The method of claim 22 wherein said step of performing signal transmission from the access line to the network trunk line includes:

receiving corresponding pairs of said data bytes and said performance monitoring bytes at the common equipment; and either determining that a signal transmission error has not occurred if the parity indicated by each pair of data bits in a data byte received at the common equipment matches the parity indicated by the corresponding pairs of performance monitoring bits in a corresponding performance monitoring byte received at the common equipment; or determining that a signal transmission error has occurred if the parity indicated by any one of the pairs of data bits in a data byte received at the common equipment does not match the parity indicated by a corresponding pair of performance monitoring bits in a corresponding performance monitoring byte received at the common equipment.

24. The method of claim 23 wherein said step of performing signal transmission from the access line to the network trunk line includes forming said words on the network trunk line, each one of said words being made up of two bytes including said data byte received at the common equipment and said performance monitoring byte;

setting the value of said performance monitoring byte equal to a parity bit; and either setting said parity bit equal to the parity of said one of said words if it is determined that a signal transmission error has not occurred; or setting said parity bit opposite of the parity of said one of said words if it is determined that a signal transmission error has occurred.

25. The method of claim 24 wherein said step of performing signal transmission from the network trunk line to the access line includes:

after said step of transmitting said corresponding bytes to the line card, combining said corresponding bytes; and after combining said corresponding bytes, determining a composite parity of said corresponding bytes; and checking the composite parity of said corresponding bytes to determine if a signal transmission error has occurred.

26. The method of claim 25 further comprising the step of incrementing a performance monitoring counter if a signal transmission error has occurred.

27. The method of claim 24 wherein said step of performing signal transmission from the network trunk line to the access line includes:

after said step of transmitting said corresponding bytes to the line card, determining a composite parity of said corresponding bytes; and checking the composite parity of said corresponding bytes to determine if a signal transmission error has occurred.

28. The method of claim 27 further comprising the step of incrementing a performance monitoring counter if a signal transmission error has occurred.

29. The method of claim 28 wherein the step of combining said pairs of data bits into data bytes and the step of combining said pairs of performance monitoring bits into performance monitoring bytes are performed simultaneously.

30. The method of claim 22 wherein the step of combining said pairs of data bits into data bytes and the step of combining said pairs of performance monitoring bits into performance monitoring bytes are performed simultaneously.

* * * * *